United States Patent [19]

Bucher

[11] Patent Number: 4,594,772
[45] Date of Patent: Jun. 17, 1986

[54] METHOD OF MANUFACTURING COMPOSITE MAGNETIC TRANSDUCER

[75] Inventor: Anton M. Bucher, Glendora, Calif.
[73] Assignee: Odetics, Inc., Anaheim, Calif.
[21] Appl. No.: 100,045
[22] Filed: Dec. 4, 1979
[51] Int. Cl.$^4$ .............................................. G11B 5/42
[52] U.S. Cl. ...................................... 29/603; 360/122
[58] Field of Search .......... 29/603; 360/122, 125–127; 204/23, 27

[56] References Cited

U.S. PATENT DOCUMENTS 3,499,214  3/1970  Schneider ............................. 29/603
3,516,153  6/1970  Schneider ............................. 29/603

Primary Examiner—Carl E. Hall
Attorney, Agent, or Firm—Spensley Horn Jubas & Lubitz

[57] ABSTRACT

The present disclosure relates to the manufacture of instrumentation magnetic transducers of the type including a pair of opposed support brackets having opposed magnetic pole pieces therein, the pole pieces in each bracket having edge faces all lying substantially in a common plane which is common with a first surface of each of the support brackets, and a pair of tip plates, each having slots in the bottom surfaces of the tip plates being adapted to be secured to respective first surfaces of the support brackets with the pole tips engaging the edge faces of the pole pieces and with a coupling gap between the pole tips to define signal channels for cooperation with a magnetic record medium. According to the present invention, the bottom surfaces of the tip plates are hard anodized prior to assembly thereof with the pole tips or the support brackets and the top surfaces of the tip plates are subsequently machined to a depth to expose the pole tips and to come close to the hard anodized area of the tip plates between the pole tips.

3 Claims, 10 Drawing Figures

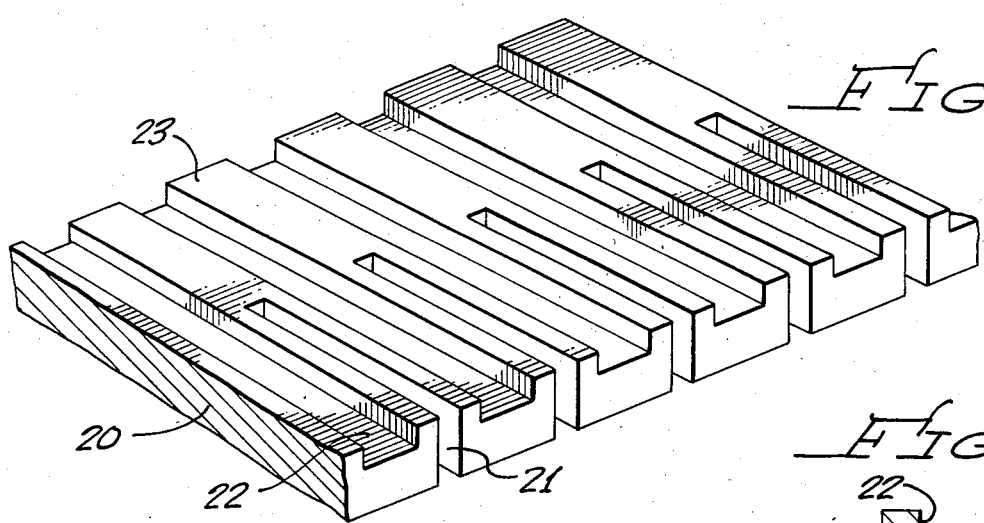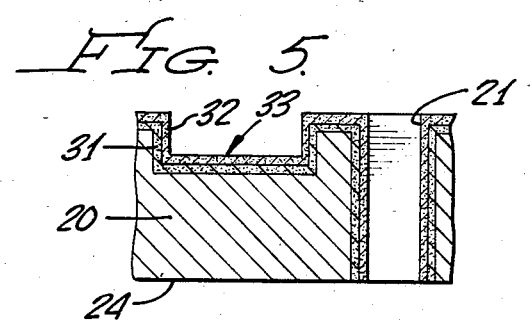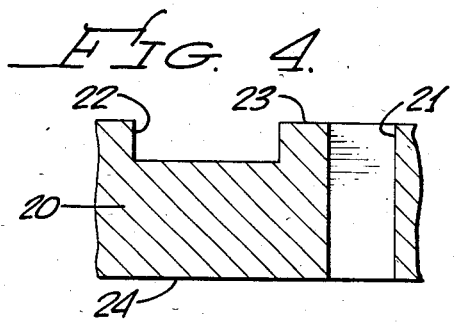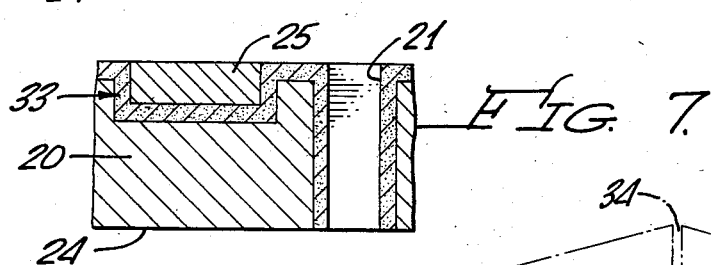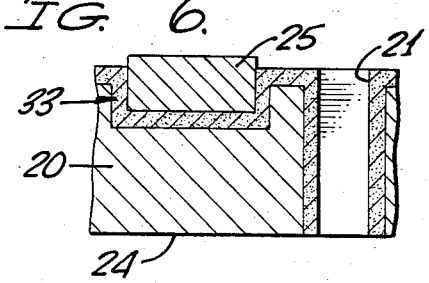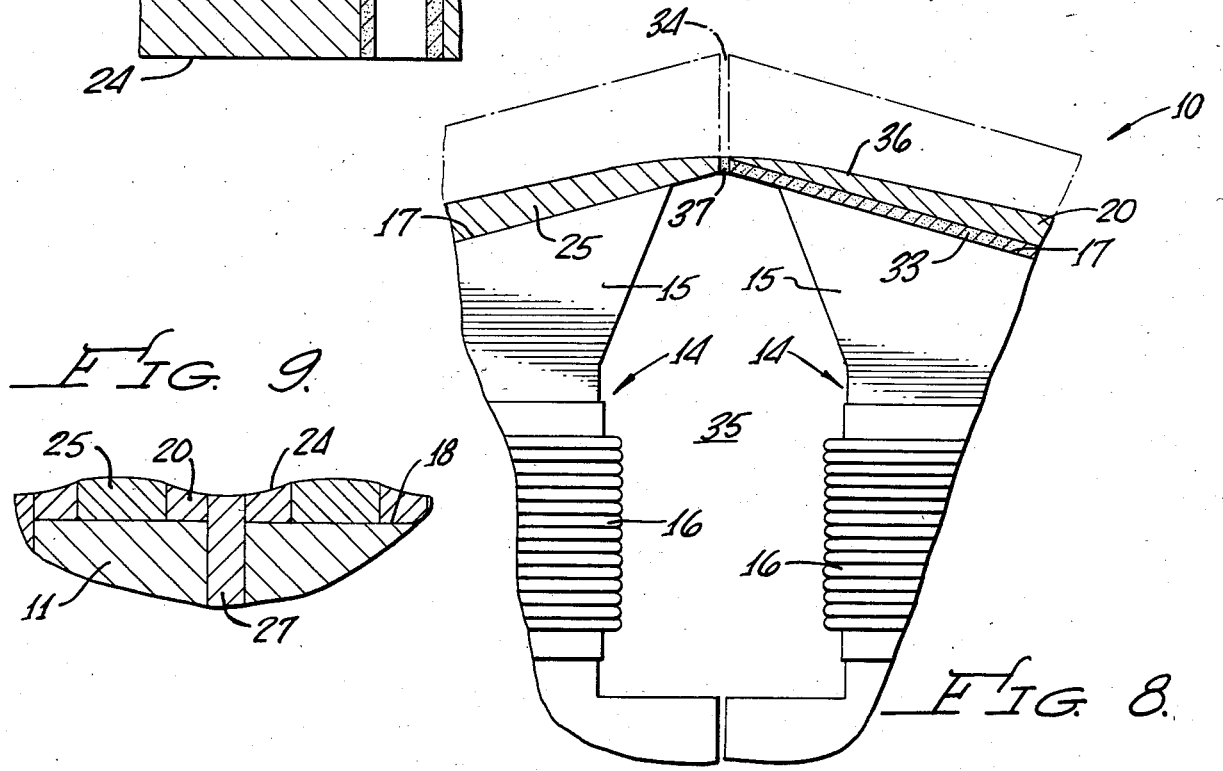

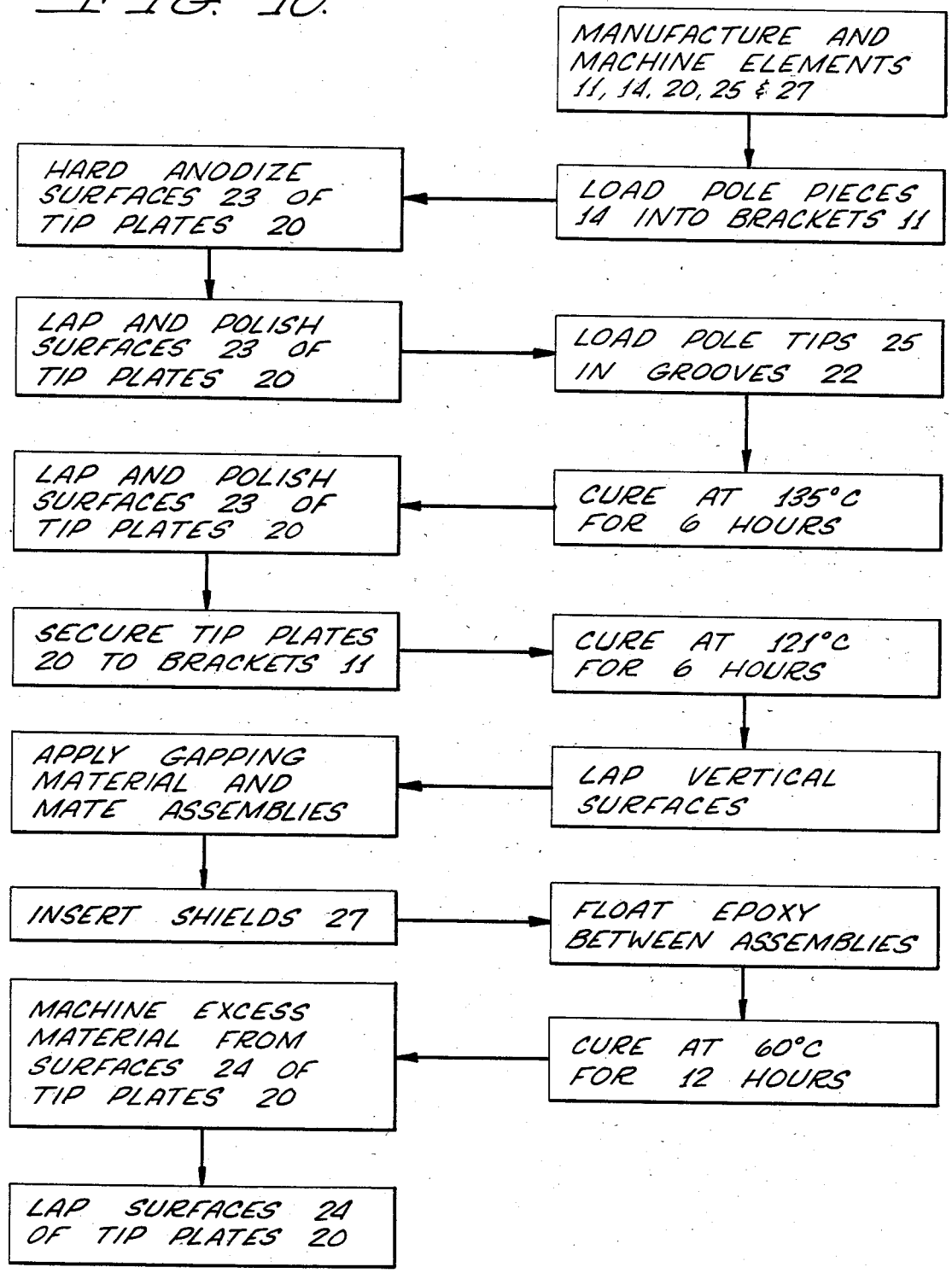

METHOD OF MANUFACTURING COMPOSITE MAGNETIC TRANSDUCER

BACKGROUND OF THE INVENTION

1. Field of the Invention

The present invention relates to long life instrumentation magnetic transducers and, more particularly, to a method of manufacturing an instrumentation magnetic transducer so as to substantially extend the operating life thereof.

2. Description of the Prior Art

One of the singular most important parts of a magnetic tape recording and playback system is the transducer which converts electrical signals to magnetic signals and back to electrical signals. While the magnetic transducer was often a highly limiting factor in wideband instrumentation recorder/reproducers, this technology has, throughout the years, improved tremendously. As a consequence, today's high performance magnetic tape recorders can be equipped with transducers that exhibit longer life, higher frequency response, and better signal-to-noise ratios. New modern equipment, combined with years of practical experience, has enabled head manufacturing firms to produce products that are quite superior, both electrically and mechanically, to those available a few short years ago.

For example, about a decade ago, 14 signal tracks was the maximum number allowed for one-inch magnetic tape. As to frequency response, 100 kHz was about the maximum at a tape speed of 60 inches per second (ips). Today, one can obtain 42 signal tracks on one-inch wide tape with a bandwidth of up to 2 MHz at 120 ips. During the 1980's, the recorder/reproducer user will, without a doubt, be offered extended bandwidth capabilities; i.e. three to four Mhz at 120 ips.

There are a number of different types of magnetic transducers that have been developed for wideband magnetic tape recording. One highly desirable type will be referred to herein as the hard-tipped magnetic head and this type of magnetic transducer is described in U.S. Pat. Nos. 3,614,339 and 3,663,765. A hard-tipped magnetic transducer is assembled in two half-bracket pieces which are bolted and/or epoxied together prior to final contouring of the head surface. These half brackets are slotted for receipt of ferrite cores which are wound with the proper number of turns and size of wire. The cores in each half bracket have edge faces which all lie substantially in a common plane which is common with a first surface of each of the brackets. A pair of tip plates are slotted to accomodate shields and grooved in the bottom surfaces thereof for receipt of pole tips made from a very hard, wear resistant material. The tip plates containing the pole tips are then secured to the half brackets having the cores therein, with the bottom surfaces of the tip plates secured to the respective first surfaces of the half brackets. The pole tips engage the edge faces of the cores with a coupling gap between the pole tips so as to define a plurality of signal channels. When viewing the tip plates from the top surfaces thereof after they are attached to the half brackets, the pole tips cannot initially be seen.

Laminated shields are then inserted into the slotted half brackets and the matching half brackets are bonded together. Various epoxies and a minimum of two bolts are used to assure a lasting bond. After the half brackets are attached to form a head stack, contouring and lapping of the top surfaces of the tip plates is performed. This exposes the pole tips and their magnetic circuits to the magnetic tape path.

The surface of the head which is exposed to the magnetic tape includes the pole tips, the laminated shields, and the body of the tip plates between these two elements. Because of the friction generated by the tape moving across this surface, wear to the various elements results. Since the pole tips are made from an extremely hard material, they tend to wear relatively slowly. On the other hand, between the active signal channels of the head, the surfaces of the tip plates provide an area of relatively softer material which typically wears at a faster rate. Since this area wears faster, track edge rounding occurs which ultimately results in head failure due to wear.

Several approaches have been suggested for the solution of this problem. One approach has been the addition of low wear materials to the surface of the heads between the active channels. This has alleviated the problem somewhat, but not in a significant manner. Other solutions include an entirely different head design including ferrite and ceramic materials for the tip plates. These are very expensive solutions and solutions which are often electrically undesirable because of noise problems. In other words, the solutions proposed heretofore have come with their own disadvantages, which have often been equally or more undesirable. If a hard wearing surface could be provided between the active channels without excessive cost and without undesirable electrical characteristics, head life could be extended. However, this has been unachievable heretofore.

SUMMARY OF THE INVENTION

According to the present invention, there is provided a method of manufacturing a magnetic transducer of the above type which indeed provides a hard wearing surface between the active channels. This substantially alleviates the problem of track edge rounding and prevents premature head failure. Furthermore, this is achieved using a metal head without changing the head's electronic characteristics. The result has been an ability to increase the life of a hard-tipped head from approximately 1,000 hours to a time in excess of 3,000 hours.

Briefly, in the manufacture of a composite magnetic transducer of the type including a pair of opposed support brackets having magnetic pole pieces therein, the pole pieces in each bracket having edge faces all lying substantially in a common plane which is common with a first surface of each of the support brackets, and a pair of tip plates, each having grooves in the bottom surface thereof for receipt of pole tips, the bottom surfaces of the tip plates being adapted to be secured to respective first surfaces of the support brackets with the pole tips engaging the edge faces of the pole pieces and with a coupling gap between the pole tips to define active signal channels for cooperation with a magnetic record medium, there is disclosed a method comprising the steps of hard anodizing the bottom surface of the tip plates prior to assembly thereof with the pole tips or the support brackets and subsequently machining the top surfaces of the tip plates to a depth close to the hard anodized areas thereof. The result is that a hard wearing surface is established between the active channels, significantly extending head life.

OBJECTS, FEATURES AND ADVANTAGES

It is therefore an object of the present invention to solve the problem of premature head failure in hard-tipped magnetic transducer heads. It is a feature of the present invention to solve this problem by providing a hard wearing surface between the heads active channels without changing the heads electronic characteristics. An advantage to be derived is that track edge rounding is postponed. A further advantage is that head life is extended. A still further advantage is that metal heads with superb dynamic properties may be used. Another advantage is that the above is achieved at a significant reduction in cost.

Still other objects, features, and attendant advantages of the present invention will become apparent to those skilled in the art from a reading of the following detailed description of the preferred embodiment constructed in accordance therewith, taken in conjunction with the accompanying drawings wherein like numerals designate like parts in the several figures and wherein:

BRIEF DESCRIPTION OF THE DRAWINGS

FIG. 3 is an enlarged perspective view of a portion of one of the tip plates of the transducer of FIG. 1;

FIGS. 4-7 are a series of enlarged sectional views of the tip plate of FIG. 3 showing the method of the present invention;

FIG. 8 is an enlarged, partial, transverse sectional view taken along the line 8—8 in FIG. 1;

FIG. 9 is an enlarged sectional view of the signal track area of the transducer of FIG. 1 showing the problem of track edge rounding; and FIG. 10 is a flow diagram of the principle steps of manufacturing the transducer of FIG. 1.

DESCRIPTION OF THE PREFERRED EMBODIMENT

Figure 1:
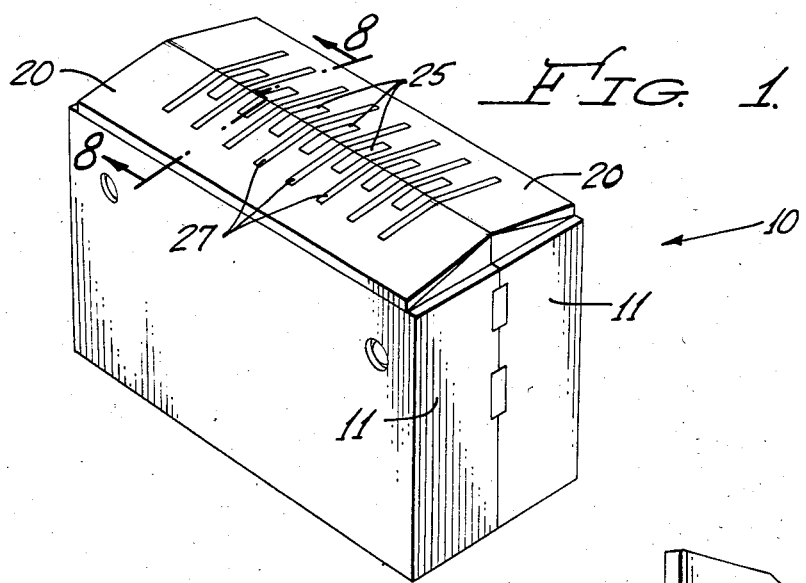
FIG. 1 is a perspective view of a hard-tipped magnetic transducer.
Figure 2:
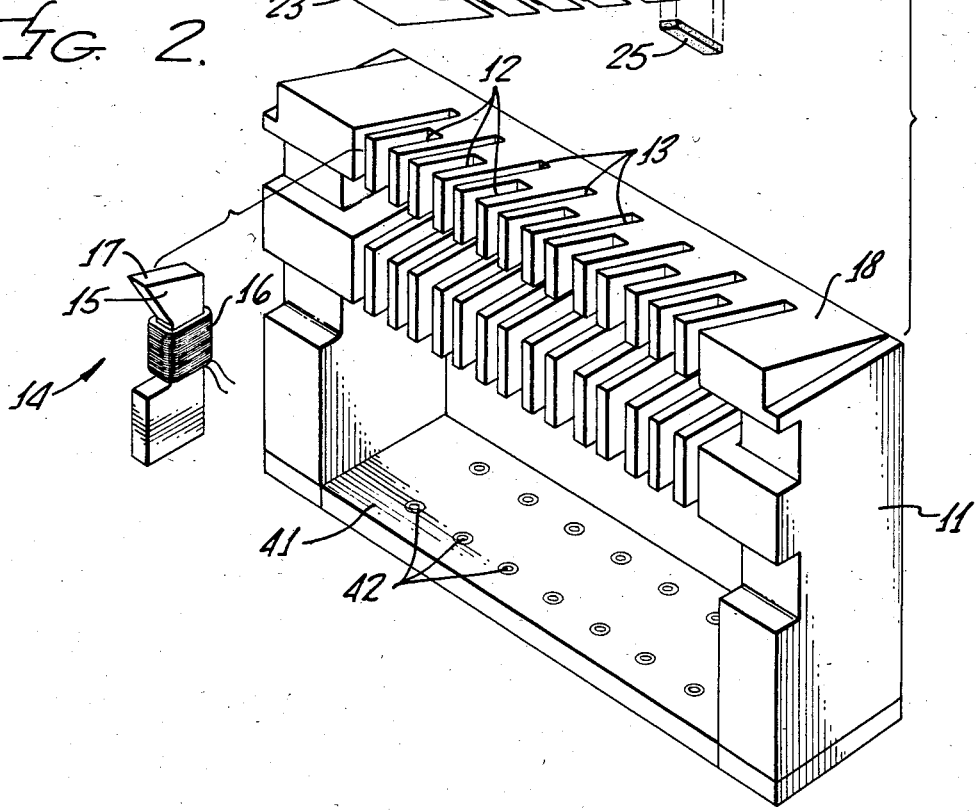
FIG. 2 is an exploded perspective view of some of the major components of half of the transducer of FIG. 1.

Referring now to the drawings and, more particularly, to FIGS. 1 and 2 thereof, there is shown a hard-tipped magnetic transducer (head), generally designated 10, of the type suitable for wideband instrumentation applications. Since the manufacture of magnetic heads is indeed a unique and exacting art, no attempt will be made to discuss all of the sciences involved in the design and manufacture of today's state-of-the-art wideband magnetic heads Only basic concepts and the technology necessary for an understanding of the present invention will be presented. For this purpose, FIGS. 1 and 2 show a seven-track, hard-tipped, wideband magnetic head and the component parts that are used in its construction. It should be generally recognized, however, that the number of channels or tracks may vary in number from one or two for use with tape as narrow as one-eighth inch to one hundred for one-inch wide tape.

Before discussing the method of manufacture of head 10, the major component parts thereof will be described. More specifically, magnetic heads manufactured for instrumentation applications, such as head 10, are assembled in two pieces which are bolted/epoxied together prior to final lapping and contouring of the head surface. Thus, head 10 includes a pair of identical, slotted support brackets 11 which are normally machined from rectangular blocks of brass or aluminum, which materials are typically utilized since their wear characteristics are most similar to the other component parts of the head assembly that interface with the magnetic tape. The material must be non-magnetic to keep the magnetic lines of flux for a given signal track from interfering with adjacent tracks. As a great deal of precision machine work is necessary, the material chosen should be easy to work with. Special aluminum alloys are generally preferred to brass as brass is heavier, harder to work with, and not as temperature stable as aluminum. The material must also be non-corrosive and fungus resistant.

As shown most clearly in FIG. 2, each support bracket 11 has a first series of slots 12 which alternate with a second series of slots 13. Slots 12 receive magnetic pole pieces 14 whereas slots 13 receive shield assemblies 27. These will be described more fully hereinafter.

Magnetic pole pieces, generally designated 14, are loaded into slots 12 in each support bracket 11 so that for each pole piece 14 in each support bracket 11 there is an opposed pole pole piece 14 in the other support bracket 11 (see FIG. 8). Each pole piece 14 includes a ferrite core 15 wound with a number of turns of fine conductive wire 16. In the manufacture of cores 15, a powdered, porous material which is basically iron, magnesium, nickel, and zinc is pressed and fired in a hot oven. The result is a ferrite. The ferrite must have a high permeability or ability to conduct magnetic lines of flux, and a low resistivity Hot-pressed ferrites are made of the same elements as normal ferrites but are pressed during the firing process. They are less porous but of similar magnetic characteristics. Glass bonded hot-pressed ferrites are generally used in video recorder/reproducer magnetic head applications.

Regardless of which process is used, ferrite cores 15 are machined and cut to the proper size and shape for use in pole pieces 14. The individual matching pairs of ferrite cores 15 are wound with the proper number of turns and size of wire 16 and bonded into slots 12 in support brackets 11. Terminal boards or connector plates 41 are inserted in or attached to brackets 11 and the individual wires of windings 16 are connected to terminals 42 by means of a solder process.

It should be noted from an inspection of FIGS. 2 and 8 that each core 15 has an edge face 17. In each half of the assembly, when positioned within slots 12 in brackets 11, the edge faces 17 of all of cores 15 lie substantially in a common plane, which plane is common with the top surface 18 of bracket 11. The reason for this will become more apparent hereinafter.

Transducer 10 includes a pair of tip plates 20, shown clearly in FIGS. 2 and 3, which are slotted, as shown at 21, to accommodate magnetic shields 27, and grooved, at 22, in bottom surface 23 thereof, for receipt of pole tips 25. The number of grooves 22 corresponds to the number of tracks or active channels head 10 is to contain. There is a slot 21 between each groove 22 and on the outside of the first and last grooves 22. Tip plates 20 are typically approximately 0.062 inches thick, slots 21 are typically 0.020 inches wide, and grooves 22 are typically 0.050 inches wide and 0.015 inches deep.

The primary function of tip plates 20 is to hold the pole tips 25 in contact with ferrite cores 15. As was the case with support brackets 11, tip plates 20 must be non-magnetic and have the same properties as brackets 11. Tip plates 20 are preferably made from the same aluminum alloy as brackets 11. It will be seen from an inspection of FIGS. 2 and 8 that the bottom surface 23 of each tip plate 20 is ultimately secured to the top surface 18 of its associated support bracket 11.

A material known as havar, which is much harder than aluminum, may be used for tip plates 20. However, second harmonic distortion problems are associated with the use of havar as it is easily magnetized. Thus, the preferred embodiment does not use havar for tip plates 20.

Inserted into each groove 22 in each tip plate 20 is a pole tip 25 having cross-sectional dimensions which are approximately the same as those of grooves 22. A Japanese-developed alloy called Sendust was originally used for video head designs. The most common American-made hard tip material is known as Alfesil. Alfesil is a combination of aluminum, iron, and silicon. Duroperm is similar to Alfesil in nature and is a trademark of Hamilton Watch Company. Mu-metal, which is 80% nickel and 20% iron, is also a semi-hard material and is used to some degree in head manufacture. While Mu-metal heads are less expensive and easier to manufacture, they have a shorter wear life.

Some magnetic head manufacturers in the United States use laminated pole tips. This procedure is utilized to provide better transfer of the magnetic lines of flux into the ferrite cores 15. Advantages of laminated versus solid designs are greater tip depth (longer wear characteristics) and better signal-to-noise capabilities for a given output response.

As will be explained more fully hereinafter, pole tips 25 are bonded into grooves 22 in each of tip plates 20. Tip plates 20, containing pole tips 25, are then affixed to brackets 11 by bonding surface 23 of the former to surface 18 of the latter. This will bring each of pole tips 25 into contact with the edge face 17 of one of cores 15. It is quite important that each pole tip 25 come into intimate contact with the edge face 17 of its associated core 15. It should also be noted that when viewing tip plates 20 from the top surface 24 thereof, after they have been attached to brackets 11, the pole tips 25 cannot be seen until a subsequent contouring of tip plates 20 is performed.

The final element of transducer 10 is a series of magnetic shields 27 which are spaced equidistantly between each record or reproduce track and at each end of the head stack. Shields 27 extend through the aligned slots 21 in tip plates 20 and slots 13 in support brackets 11. Shields 27 are constructed of thin sheets (laminations) of copper sandwiched between layers of Mu-metal. The particular design of a given head type dictates the number of laminations used. The primary function of shields 27 is to minimize interference between adjacent active channels.

The components of head 10 described above are well-known to those skilled in the art. Furthermore, the process of manufacturing the parts to form a complete transducer is also generally well known. The completed transducer shown in FIG. 1 has the top surfaces 24 of tip plates 20 exposed and machined, as will be described more fully hereinafter, to also expose all of pole tips 25 and all of shields 27. The pole tips 25 are arranged in pairs to define active channels or signal tracks. These tracks are separated by shields 27.

The problem encountered in a conventional head may be seen in FIG. 9. FIG. 9 shows the surface 24 of a conventional head after approximately 1000 hours. It is seen that because the material of tip plates 20 and shields 27 is much softer than the material of pole tips 25, track edge rounding results which ultimately causes head failure. By following the teachings of the present invention, a hard wearing surface is maintained between the active channels, thereby substantially extending head life.

With reference to the drawings and, more particularly, to FIGS. 4-8 and 10 thereof, head 10 is manufactured as follows. Initially, support brackets 11, tip plates 20 and pole tips 25 are carefully machined and pole pieces 14 and shields 27 are assembled. Pole pieces 14 are then loaded into support brackets 11 with edge faces 17 coplanar with each other and with surface 18 of each bracket 11. These steps are generally known in the prior art.

According to the present invention, the manufacturing process next includes an application of a hard sulfuric anodize to the bottom surface 23 of each of tip plates 20. This hard anodizing also covers the inside surfaces of slots 21 and grooves 22. A cross-section of one of tip plates 20 before anodization is shown in FIG. 4. The same cross-section after anodization is shown in FIG. 5. Two areas of anodization 31 and 32 are shown. That is, the process of anodization causes an area 31 of hard surface within the surface which previously existed before the anodization and a second area 32 of hard surface which forms outside of the surface previously in existence. While shown as separate surfaces 31 and 32, the completed result is a single area of hard anodize, hereinafter generally referred to as 33, which has a depth typically of approximately 3 mils.

The anodizing process results in a thick, dense, hard area 33 along surface 23 of tip plates 20. Anodization is applied by an electrolytic oxidation treatment in which the aluminum tip plate 20 is made the anode in a suitable electrolyte. The process controlled by current density. For a thorough discussion of the methods for forming hard anodic coatings on aluminum alloys, reference should be had to military specification No. 8625, revision C, type III, class 1.

After the application of a hard anodize to surface 23 of tip plates 20, which anodizing also covers the inside of shield slots 21 and pole tip grooves 22, the manufacture of transducer 10 proceeds in a generally conventional manner. That is, surfaces 23 of tip plates 20 are lapped and polished to insure flatness. As shown in FIG. 6, pole tips 25 are then cemented in place in grooves 22, preferably using Shell Epon 820/A epoxy.

As will be explained more fully hereinafter, many of the steps of manufacture of transducer 10 require temperature cycling. These cycles vary in time and temperature depending upon the desired function, such as the hardening of epoxies or conditioning of the types of material. These cycles are generally well known to those skilled in the art but will be described briefly. Specifically, at this point, the assembly of tip plates 20 with pole tips 25 cemented therein is cured at 135° C. for approximately six hours.

The next step is to lap surfaces 23 of tip plates 20 to provide uniform flatness across the total bottom surfaces 23 of tip plates 20 and the bottom surfaces of pole tips 25 in the same flat plane. At the completion of this step, tip plates 20 and pole tips 25 have the appearance shown in FIG. 7.

Tip plates 20 are then secured to support brackets 11 by bringing surfaces 23 of the former into contact with surfaces 18 of the latter. Securement is done using a metal-to-metal epoxy, such as Shell Epon 830/A, and suitable pressure hold-down fixtures. The individual support brackets 11 with the tip plates 20 attached thereto are then cured at 121° C. for approximately six hours.

At this point, the two half assemblies are ready to be mated. First, the mating faces of the two assemblies are lapped in the vertical plane to a flatness of five-millionths of an inch across that vertical surface. A gapping material which ultimately forms the recording or reproducing gap 37 is applied, as shown at 34 in FIG. 8, and the two half assemblies are mated, bolted and clamped together. At this time, the individual shields 27 are inserted into the slots 21 in support brackets 11. It should be noted that each shield 27 extends across the entire gap, it not being necessary to provide shields in half pieces as was the case with the remaining components. In any event, after shields 27 are inserted into slots 21, a suitable epoxy material, such as Emerson/Cummings Stycast 2651 mm, is floated inside the spaces between the two half assemblies, such as in the space 35 shown in FIG. 8, which epoxy seals the two half assemblies together. At this point, the entire assembly is again cured at 60° C. for approximately twelve hours.

As shown in phantom in FIG. 8, the completed assembly is such that from the top thereof, the anodized areas 33 in the bottom surfaces of tip plates 20 are not exposed nor are the pole tips 24 in grooves 22. Therefore, the next several operations are designed to contour the top surfaces 24 of tip plates 20 to the final configuration, shown at 36. This is done in several steps. First of all, excess epoxy and excess material are machined off the top surfaces 24 of tip plates 20. This is done by milling whereby a portion of surfaces 24 of tip plates 20 are removed. Next, additional material is removed to expose the material of pole tips 25. Since pole tips 25 typically have a Rockwell hardness of C50, minimum, the process is carefully done by lapping. Head 10 is mounted in a fixture which is placed on a lapping machine.

The greater the depth of tips 25 which remains when transducer 10 is placed into operation, the greater its expected life. In actual present-day manufacture of hard-tipped wideband magnetic heads, this depth can be expected to be as much as three mils. A thicker (deeper) tip would have a longer life, at the expense of a lower output during high frequency operation.

Most importantly, it will be noted that during this contouring step, the top surfaces 24 of tip plates 20 are machined so that the remaining depth of tip plate 20 adjacent the recording gap is just slightly greater than the depth of hard anodized area 33. accordingly, when head 10 is placed into use, and the exposed surfaces of tip plates 20 are exposed to the friction of the magnetic recording material, the resultant wear shortly exposes hard anodized area 33. At this time, the hardness of area 33 is approximately the same as the hardness of pole tips 25, so that wear across gap 37 now proceeds at a substantially uniform rate to significantly slow down the process of track edge rounding. By postponing track edge rounding, head life is substantially extended.

It can therefore be seen that according to the present invention, there is provided a method of manufacturing a magnetic transducer which indeed provides a hard wearing surface between the active channels. This substantially alleviates the problem of track edge rounding and prevents premature head failure. Furthermore, this is achieved using a metal head without changing the heads electronic characteristics. The result has been an ability to increase the life of a hard-tipped head from approximately 1000 hours to a time in excess of 3000 hours.

While the invention has been described with respect to the preferred embodiment constructed in accordance therewith, it will be apparent to those skilled in the art that various modifications and improvements may be made without departing from the scope and spirit of the invention. Accordingly, it is to be understood that the invention is not to be limited by the specific illustrative embodiment, but only by the scope of the appended claims.

I claim:

1. In the manufacture of a composite magnetic transducer of the type including a pair of opposed support brackets having opposed magnetic pole pieces therein, the pole pieces in each bracket having edge faces all lying substantially in a common plane which is common with a first surface of each of said support brackets, and a pair of tip plates each having grooves in a first surface thereof for receipt of pole tips, the first surfaces of said tip plates being adapted to be secured to respective first surfaces of said support brackets with said pole tips engaging said edge faces of said pole pieces and with a coupling gap between said pole tips to define signal channels for cooperation with a magnetic record medium, the method comprising:

hard anodizing said first surfaces of said tip plates prior to assembly thereof with said pole tips or said support brackets, wherein said step of hard anodizing said first surfaces of said tip plates also hard anodizes the inside surfaces of said grooves;

securing said pole tips into said grooves in said tip plates subsequent to said hard anodizing step;

subsequently securing said tip plates to said support brakcets;

subsequently securing said opposed support brackets to each other; and subsequently machining the surfaces of said tip plates opposite to said first surfaces thereof to a depth close to or at said hard anodized areas thereof.

2. In the manufacture of a composite mangetic transducer according to claim 1 wherien said support brackets and said tip plates have aligned slots therein between said pole pieces and pole tips for receipt of shields to minimize interference between said signal channels, the method wherein said step of hard anodizing said first surfaces of said tip plates also hard anodizes the inside surfaces of said slots in said tip plates.

3. In the manufacture of a composite magnetic transducer of the type including a pair of opposed support brackets having opposed magnetic pole pieces therein, the pole pieces in each bracket having edge faces all lying substantially in a common plane which is common with a first surface of each of said support brackets, and a pair of tip plates each having grooves in a first surface thereof for receipt of pole tips, the first surfaces of said tip plates being adapted to be secured to respective first surfaces of said support brackets with said pole tips engaging said edge faces of said pole pieces and with a coupling gap between said pole tips to define signal channels for cooperation with a magnetic record medium, the method comprising:

forming a hard anodized area in said first surfaces of said tip plates prior to assembly thereof with said pole tips or said support brackets, wherein said step of forming a hard anodized area also forms a hard anodized area in the inside surfaces of said grooves;

securing said pole tips into said grooves in said tip plates subsequent to said hard anodizing step;

subsequently securing said tip plates to said support brackets;

subsequently securing said opposed support brackets to each other; and subsequently machining the surfaces of said tip plates opposite to said first surfaces thereof to a depth close to or at said hard anodized areas thereof.

* * * * *